(12) United States Patent
Maini et al.

(10) Patent No.: US 10,611,345 B2
(45) Date of Patent: Apr. 7, 2020

(54) MOBILE OPERATING MACHINE

(71) Applicant: CIFA S.P.A., Senago (IT)

(72) Inventors: Paolo Dario Maini, Lissone (IT); Paolo Sala, Ceriano Laghetto (IT)

(73) Assignee: CIFA S.P.A., Senago (IT)

( * ) Notice: Subject to any disclaimer, the term of this patent is extended or adjusted under 35 U.S.C. 154(b) by 0 days.

(21) Appl. No.: 16/248,181

(22) Filed: Jan. 15, 2019

(65) Prior Publication Data
US 2019/0217826 A1 Jul. 18, 2019

(30) Foreign Application Priority Data
Jan. 16, 2018 (IT) .................. 102018000001069

(51) Int. Cl.
*B60S 9/02* (2006.01)
*B66C 23/80* (2006.01)
*B66C 23/78* (2006.01)
*E04G 21/04* (2006.01)

(52) U.S. Cl.
CPC ............ *B60S 9/02* (2013.01); *B66C 23/78* (2013.01); *B66C 23/80* (2013.01); *E04G 21/0436* (2013.01)

(58) Field of Classification Search
CPC . B60S 9/02; B66C 23/78; B66C 23/80; E04G 21/0436
See application file for complete search history.

(56) References Cited

U.S. PATENT DOCUMENTS

| 4,624,357 | A | * | 11/1986 | Oury | B65G 21/14 198/313 |
|---|---|---|---|---|---|
| 5,758,785 | A | * | 6/1998 | Spinosa | B66C 23/48 212/232 |
| 6,276,718 | B1 | * | 8/2001 | Wolfram | B60S 9/12 212/302 |
| 6,811,161 | B1 | * | 11/2004 | Anderson | E06C 5/04 182/19 |
| 6,840,540 | B2 | * | 1/2005 | Fugel | B66C 23/80 280/763.1 |

(Continued)

FOREIGN PATENT DOCUMENTS

| CN | 103158682 A | 6/2013 |
|---|---|---|
| DE | 10032622 A1 | 1/2002 |

(Continued)

*Primary Examiner* — Jacob B Meyer
(74) *Attorney, Agent, or Firm* — Cantor Colburn LLP (57) ABSTRACT

Mobile operating machine, provided with at least a work device (11) supported by a movement turret (14), at least a pair of stabilizing front legs (12a, 12b) and at least a pair of stabilizing back legs (13a, 13b); the mobile operating machine also comprises a support structure (18) provided with at least a pair of box-like elements (19a, 19b) configured to house the stabilizing front legs (12a, 12b) or back legs, and at least a positioning seating (20) of the movement turret (14) made in a crossing zone (Z) of the box-like elements (19a, 19b); each box-like element (19a, 19b) is provided with a first end (23a, 23b) that is open and through which a respective stabilizing front leg (12a, 12b), or back leg, is slidingly mobile and a second end (25a, 25b), opposite the first end (23a, 23b) and in correspondence with which a respective stabilizing back leg (13a, 13b), or front leg, is pivoted, so as to rotate around a corresponding axis of rotation (R1, R2).

7 Claims, 4 Drawing Sheets

(56) References Cited

U.S. PATENT DOCUMENTS

| | | | | |
|---|---|---|---|---|
| 7,552,828 B2* | 6/2009 | Fugel | ............... | E04G 21/0436 212/302 |
| 7,909,059 B2* | 3/2011 | Wehner | ............... | B66C 23/78 137/615 |
| 8,224,577 B2* | 7/2012 | Gelies | ............... | B66C 13/40 701/50 |
| 8,282,130 B2* | 10/2012 | Fuegel | ............... | B62D 53/04 280/765.1 |
| 8,366,148 B2* | 2/2013 | Benz | ............... | B62D 21/186 280/763.1 |
| 8,794,670 B2* | 8/2014 | Fuegel | ............... | B66C 23/80 280/763.1 |
| 9,068,366 B2* | 6/2015 | Petzold | ............... | B66C 23/78 |
| 9,175,484 B2* | 11/2015 | Fuegel | ............... | E04G 21/0445 |
| 9,377,032 B2* | 6/2016 | Fuegel | ............... | E04G 21/04 |
| 9,410,334 B2* | 8/2016 | Fugel | ............... | E04G 21/0436 |
| 9,476,211 B2* | 10/2016 | Westermann | ....... | E04G 21/0445 |
| 2008/0142464 A1* | 6/2008 | Fugel | ............... | E04G 21/0436 212/349 |
| 2009/0283163 A1* | 11/2009 | Wehner | ............... | B66C 23/78 137/615 |
| 2010/0253044 A1* | 10/2010 | Benz | ............... | B62D 21/186 280/433 |
| 2010/0264635 A1* | 10/2010 | Fuegel | ............... | B62D 53/04 280/763.1 |
| 2014/0246100 A1* | 9/2014 | Xu | ............... | B66C 23/78 137/351 |
| 2015/0056084 A1* | 2/2015 | Fuegel | ............... | E04G 21/0445 417/234 |
| 2015/0176608 A1* | 6/2015 | Fuegel | ............... | E04G 21/04 280/830 |
| 2016/0032602 A1* | 2/2016 | Fugel | ............... | E04G 21/0436 248/49 |
| 2016/0047133 A1* | 2/2016 | Westermann | ....... | E04G 21/0445 137/343 |
| 2019/0217826 A1* | 7/2019 | Maini | ............... | B60S 9/02 |

FOREIGN PATENT DOCUMENTS

| | | | |
|---|---|---|---|
| DE | 202007002114 U1 | 4/2007 | |
| EP | 1847505 A2 * | 10/2007 | ............... E02F 9/085 |
| WO | 2015198089 A1 | 12/2015 | |

* cited by examiner fig. 1 fig. 2 fig. 3 fig. 4 fig. 5 fig. 6

MOBILE OPERATING MACHINE

CROSS REFERENCE TO RELATED APPLICATION

This application is related to and claims the benefit of Italian Patent Application Number 102018000001069 filed on Jan. 16, 2018, the contents of which are herein incorporated by reference in their entirety.

FIELD OF THE INVENTION

The present invention concerns a mobile operating machine, in particular a mobile operating machine which, during working operations, requires stabilizing legs, for example a concrete pumping machine, a truck-mounted pump, a crane, for example a telescopic crane, or other.

BACKGROUND OF THE INVENTION

Mobile operating machines, such as concrete pumping machines for example, generally consist of a vehicle which has a front driving cab and a back frame, on which a work device is positioned, for example an articulated arm for pumping concrete.

The work device is moved by a movement turret, for example a rotatable turret on which the work device is positioned.

Moreover, these mobile operating machines generally require stabilizing legs, that is, at least a pair of front stabilizing legs and at least a pair of back stabilizing legs which, when necessary and during work operations, allow a stable support of the mobile operating machine on the ground.

Vertical hydraulic actuators are associated with the free and terminal ends of the front stabilizing legs and the back stabilizing legs, which allow to lift and stabilize the position of the entire mobile operating machine.

Normally, the front stabilizing legs comprise telescopic tubular elements that can be extended in a substantially horizontal direction, that is, parallel to the ground, while the back stabilizing legs are normally pivoted to the support structure, therefore they can be rotated, generally around an axis substantially perpendicular to the ground, with respect to the support structure, so as to be opened or closed.

The back stabilizing legs are normally disposed, in the inactive position, parallel to the longitudinal extension of the mobile operating machine and can be opened, if necessary, by rotation around rotation pins or suchlike, to be disposed in an active position and resting stably on the ground with said vertical hydraulic actuators.

On the contrary, the front stabilizing legs, with the extendable telescopic elements, pass from an inactive retracted position to an active elongated position, in which they rest stably on the ground by the activation of said vertical hydraulic actuators.

Normally, the front or back stabilizing legs are housed in, or connected to, support structures which are very heavy, bulky and which can require long assembly and mounting times on the mobile operating machine.

Moreover, the rotation points, or joints, of the back stabilizing legs and the extension or sliding zones of the front stabilizing legs with respect to the support structure do not normally allow an optimal distribution of the loads, both with regard to the back part of the support structure, and also with regard to the front part thereof.

In particular, it is known that the mechanical stresses induced on the front and back stabilizing legs are due, for the most part, to the distribution of weights and to the movements to which the work device, for example, the articulated arm, is subjected.

These mechanical stresses are very variable both due to movements of the articulated arm itself, and also due to movements of the rotatable turret to which the work device is connected.

It is also known that the movement turret is attached to the back frame of the operating machine, usually in a forward position, that is, toward the front driving cab of the vehicle. This disposition, in addition to increasing the bulk in length of the operating machine, also causes an imbalance in the distribution of loads between the pair of front stabilizing legs and the back ones.

The distribution of loads, therefore, is not homogeneous and uniform, and can generate imbalances on the mobile operating machine or different stresses between the front and back stabilizing legs.

Known support structures for stabilizing legs are also not very compact and rather bulky and, normally, also house some service systems of the operating machine itself, making it difficult to access, if any possible intervention is required, for example maintenance or other. One example of such service systems can be the oil tank, normally integrated into the support structure of the stabilizing legs.

US 2014/0246100 A1 describes a truck-mounted pump for delivering concrete in which there is a stabilization system equipped with extendable front legs and back legs articulated with respect to a pivoting point. This document does not provide details and characteristics of the pivoting positions of the back legs with respect to the structure that contains the front legs.

DE 20 2007 002 114 U1 describes a similar truck-mounted pump for delivering concrete in which the back stabilizing legs are pivoted on a bearing structure.

DE 100 32 622 A1 describes a truck-mounted pump equipped with four support legs in which at least the front legs are both telescopically extendable and rotatable with respect to a pivoting point.

CN 103158682 and WO 2015/198089 concern support structures for truck-mounted pumps equipped with four telescopically extendable legs.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore a need to perfect a mobile operating machine which can overcome at least one of the disadvantages of the state of the art.

One purpose of the present invention is to provide a mobile operating machine which is provided, in particular, with a support structure for the stabilizing legs which allows a homogeneous and uniform distribution of the loads in all its parts and thus allows to prevent undesired imbalances and stresses on the machine.

Another purpose of the present invention is to provide a mobile operating machine which allows to optimize and simplify the allocation of spaces with regard to service systems, for example the oil tank.

Another purpose of the present invention is to provide a mobile operating machine which is equipped with a support structure for the stabilizing legs, which is compact and not bulky compared with known solutions, which is also easy to assemble, has low costs and is easy to access the various components, which, in any case, are advantageously fewer in number than what is required in known solutions.

Another purpose of the present invention is to provide a mobile operating machine which, thanks in particular to its compactness, allows simple and optimal maintenance and monitoring operations, compared with known articulated structures of greater complexity which therefore have greater difficulties in inspection, monitoring and maintenance.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a mobile operating machine according to the invention is provided with at least a work device supported by a movement turret, at least a pair of stabilizing front legs and at least a pair of stabilizing back legs.

Both the front and back stabilizing legs have a retracted transport position and an extended working position.

In the present description, although in a non-restrictive manner, we will deal mainly with the solution in which the front legs are telescopically extendable to move from the retracted to the extended position, while the back legs are pivoted in a rotation pin and rotate from the retracted close up against the machine to the extended position away from the machine.

According to one aspect of the invention, the mobile operating machine comprises a support structure provided with at least a pair of box-like elements configured to house the stabilizing front legs or back legs, and at least a positioning seating of the movement turret made in a crossing zone of the box-like elements, each box-like element is provided with a first end that is open and through which a respective stabilizing front leg, or back leg, is slidingly mobile and a second end, opposite the first end and in correspondence with which a respective stabilizing back leg, or front leg, is pivoted, so as to rotate around a corresponding axis of rotation.

This constructive configuration of the mobile operating machine allows to obtain a support structure having a distribution of loads, both toward the front stabilizing legs and toward the back stabilizing legs, which is extremely homogeneous and balanced. Moreover, the configuration of the present invention allows to obtain discharge paths of the mechanical loads, which from the movement turret are discharged toward the stabilizing legs, which are substantially equal between the front stabilizing legs and the back stabilizing legs.

This prevents intensification of stresses along the discharge paths of the mechanical loads.

In particular, with the support structure of the present invention it is possible to obtain an optimization of the distribution of loads such that the load paths are not subjected to deviations in direction from the movement turret, to the front and back stabilizing legs.

According to another aspect of the invention, the support structure is formed by a single block, for example made of sheet metal or similar, suitable to define the box-like elements and the positioning seating for the movement turret.

In accordance with a possible embodiment, the front stabilizing legs are each slidably inserted in a respective box-like element, and can be extended from it in order to move between the two operating positions, while the back stabilizing legs are each pivoted to a respective second end of one of the box-like elements and rotate with respect to it to move between the two operating positions.

The positioning seat of the movement turret can be made above the box-like elements and through it an axis of rotation of the movement turret passes.

The axis of rotation of the movement turret can be substantially parallel to the rotation axes around which the back or front stabilizing legs rotate.

The support structure can be substantially cross shaped, in the center of which the housing seating of the movement turret is positioned.

The front or back stabilizing legs can comprise extending telescopic elements along the sliding axes.

The extending telescopic elements can be inserted axially into the respective box-like elements to assume the compact condition.

The sliding axes of the extending telescopic elements can be offset in height.

Moreover, the sliding axes can intersect the axis of rotation of the movement turret.

Each axis of rotation of the back stabilizing legs also intersects one of the sliding axes of the telescopic elements and the axis of rotation of the movement turret.

The axis of rotation of the movement turret can be substantially perpendicular to the sliding axes.

The mobile operating machine can comprise service systems, separate and independent from the support structure of the front and back stabilizing legs and of the housing seating of the movement turret.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Figure 1:
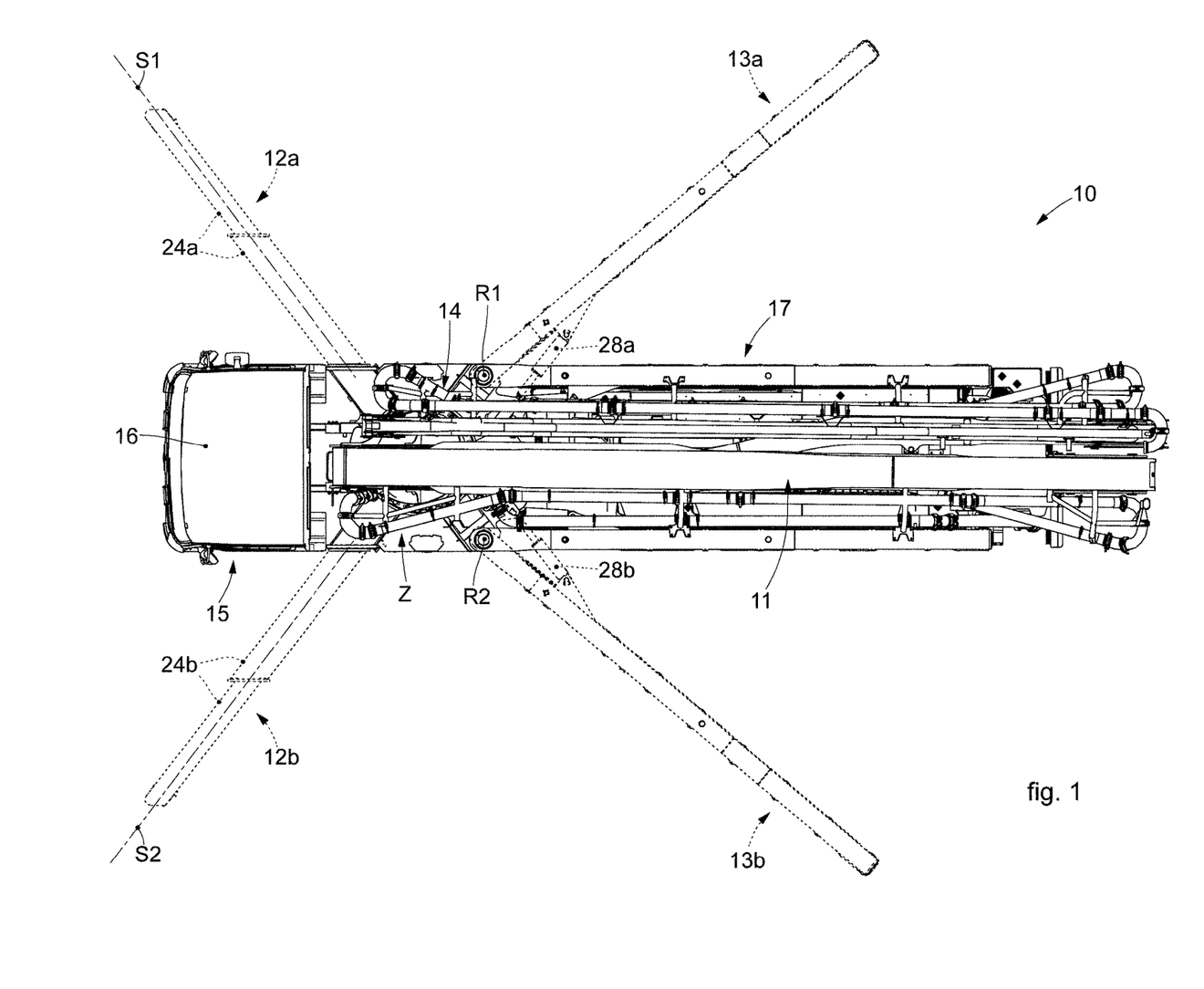
FIG. 1 is a plan view of a mobile operating machine with stabilizing legs according to the invention.
Figure 2:
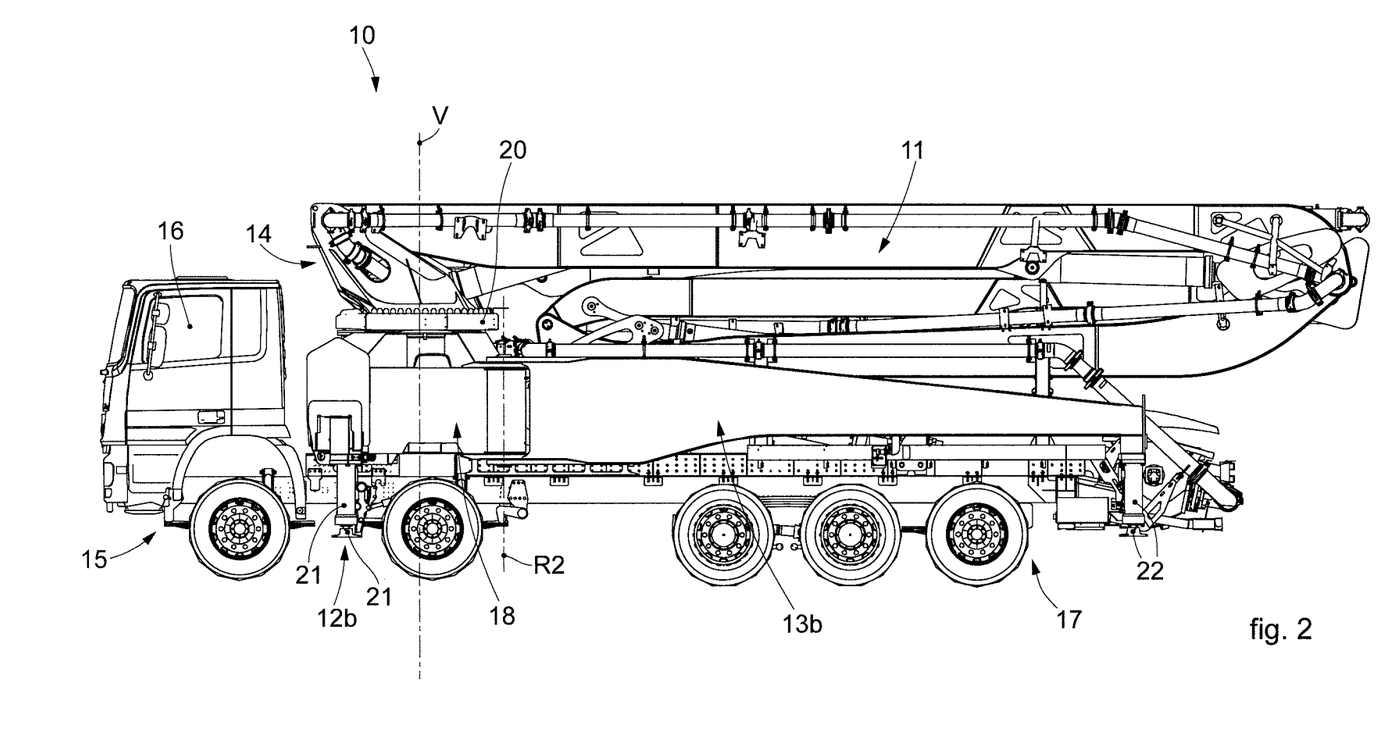
FIG. 2 is a lateral view of the mobile operating machine in the working position of FIG. 1.

In the attached drawings, see in particular FIG. 1 and FIG. 2, a mobile operating machine 10 according to the present invention is shown.

The mobile operating machine 10 comprises a work device 11, at least a pair of front stabilizing legs 12a and 12b and at least a pair of back stabilizing legs 13a and 13b.

Figure 4:
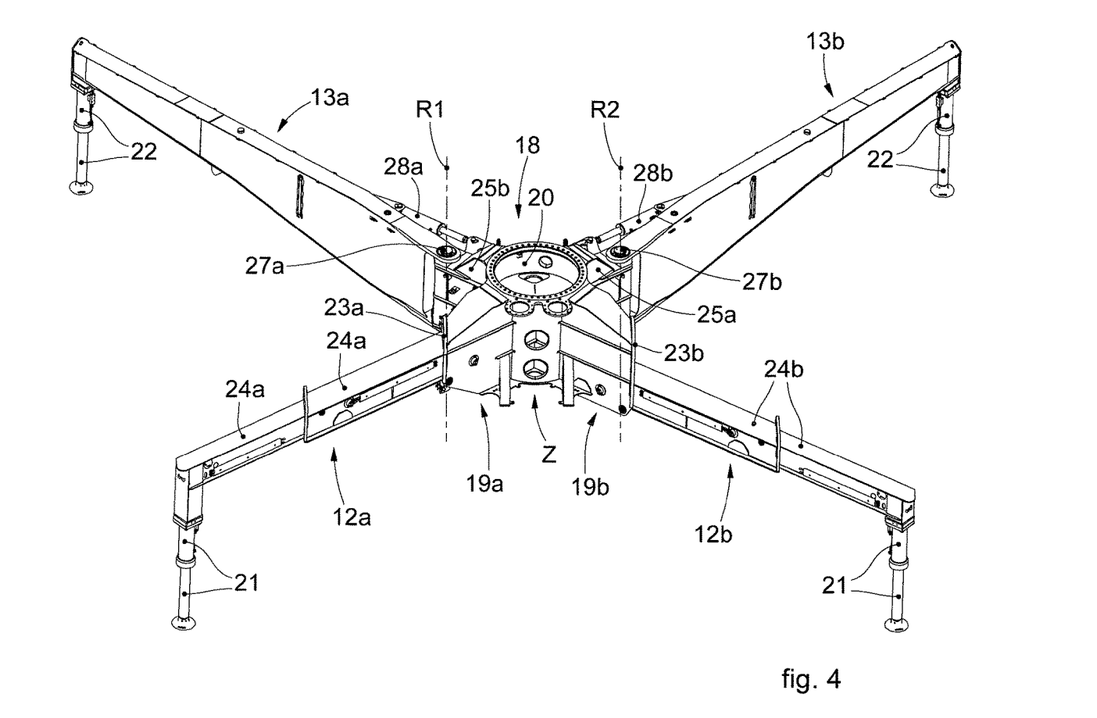
FIG. 4 is a three-dimensional view of the support structure in FIG. 3.

The front and back stabilizing legs 12a and 12b, 13a and 13b can comprise telescopic elements 21 and 22 for resting on the ground, see also FIG. 4.

The telescopic elements 21 and 22 can be associated with the front and back stabilizing legs 12a, 12b, 13a and 13b, each in correspondence with respective free terminal ends of the latter.

The telescopic elements 21 and 22 can be telescopically slidable, to be made to rest on the ground, in a transverse direction, or orthogonal to the oblong development of the front and back stabilizing legs 12a, 12b, 13a and 13b with which they are associated.

If the mobile operating machine 10 is a concrete pumping machine, the work device 11 can be, for example, an articulated arm for pumping concrete, shown in FIG. 1 and FIG. 2 in the lowered and inactive position.

The work device 11 is supported and moved by a movement turret 14, able to allow at least one rotation thereof around an axis of rotation V, which can be substantially vertical during use.

The mobile operating machine 10 also comprises a vehicle 15 provided with a driving cab 16 and a back frame 17, on which the work device 11 is positioned.

The front and back stabilizing legs 12a, 12b, 13a and 13b are supported by a support structure 18, provided with at least one pair of box-like elements 19a and 19b which cross in a crossing zone Z.

In particular, it can be provided that each box-like element 19a, 19b has an oblong development and is disposed transverse to and overlapping the other box-like element 19b, 19a, to define a cross shape.

Each box-like element 19a, 19b is provided with a respective tubular cavity in which a respective front stabilizing leg 12a, 12b can be inserted slidingly, as described below.

In accordance with possible embodiments of the invention, the box-like elements 19a, 19b can be defined by section bars having a polygonal cross-section, preferably rectangular. The front stabilizing legs 12a, 12b can have a cross-section shape substantially identical to that of the box-like elements 19a, 19b to allow their reciprocal sliding coupling.

In accordance with possible solutions, each tubular cavity is at least open in correspondence with one of its first ends to allow the insertion and sliding of the respective front stabilizing leg 12a, 12b.

The support structure 18 is provided, in the crossing zone Z of the box-like elements 19a and 19b, with a housing seating 20 to house the movement turret 14.

The housing seating 20 defines a guide for the rotation of the movement turret 14 around the axis of rotation V.

In particular, the support structure 18 is formed by a single block, for example made of sheet metal or suchlike, suitable to define the box-like elements 19a and 19b and the housing seating 20 of the movement turret 14.

The support structure 18 can therefore be substantially cross-shaped, at the center of which the housing seating 20 of the movement turret 14 is positioned.

The housing seating 20 of the movement turret 14 can have a cylindrical shape and is able to house at least a corresponding cylindrical part of the movement turret 14.

The housing seating 20 of the movement turret 14 is positioned above the crossing zone Z of the box-like elements 19a and 19b.

This positioning of the movement turret 14 allows to directly discharge the loads acting on the latter toward the box-like elements 19a, 19b, preventing deviations of the stress loading paths as occurs, for example, in known solutions.

The axis of rotation V of the movement turret 14 is disposed at the center of the seating 20, hence substantially at the center of the movement turret 14.

The front stabilizing legs 12a and 12b can be selectively inserted/extracted, by means of telescopic sliding, into/from the tubular cavity of the box-like element 19a, 19b to respectively assume an inactive position, retracted inside the tubular cavity, and an active position extended outside the tubular cavity, in which the operating machine is stabilized.

In particular, each tubular cavity of the box-like elements 19a, 19b defines a respective sliding axis S1 and S2 along which the front stabilizing legs 12a, 12b are slidingly moved.

In possible solutions, the front stabilizing legs 12a and 12b comprise extending telescopic elements 24a and 24b which, in the retracted position, are housed in a corresponding box-like element 19a and 19b of the support structure 18.

Each box-like element 19a and 19b comprises a first end 23a and 23b which is open and is able to allow the front stabilizing legs 12a, 12b to enter and exit, that is, in this case the extending telescopic elements 24a and 24b of the front stabilizer legs 12a and 12b.

Figure 6:
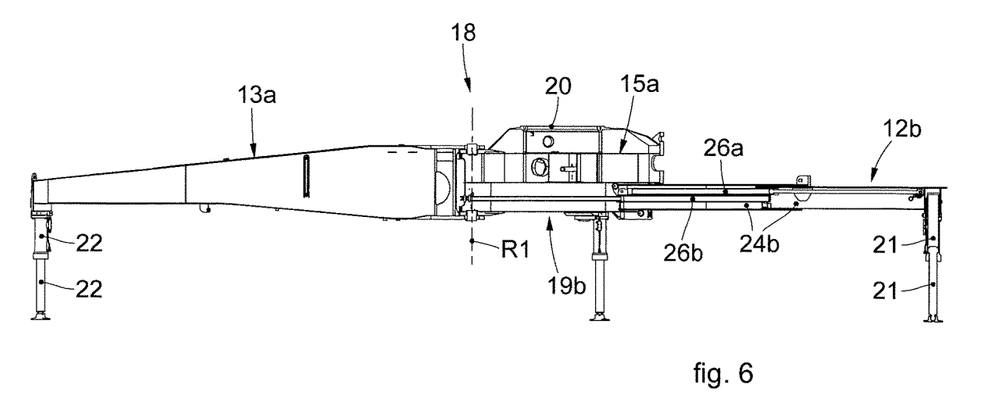
FIG. 6 is a section view of the support structure considered along the line VI-VI of FIG. 5.

The telescopic elements 24a and 24b of the front stabilizing legs 12a and 12b can be extended in the operating position by means of corresponding actuators 26a and 26b (FIG. 6).

The telescopic elements 24a and 24b of the front stabilizing legs 12a and 12b are extendable or retractable along the sliding axes S1 and S2 which both pass through the crossing zone Z of the support structure 18.

Figure 3:
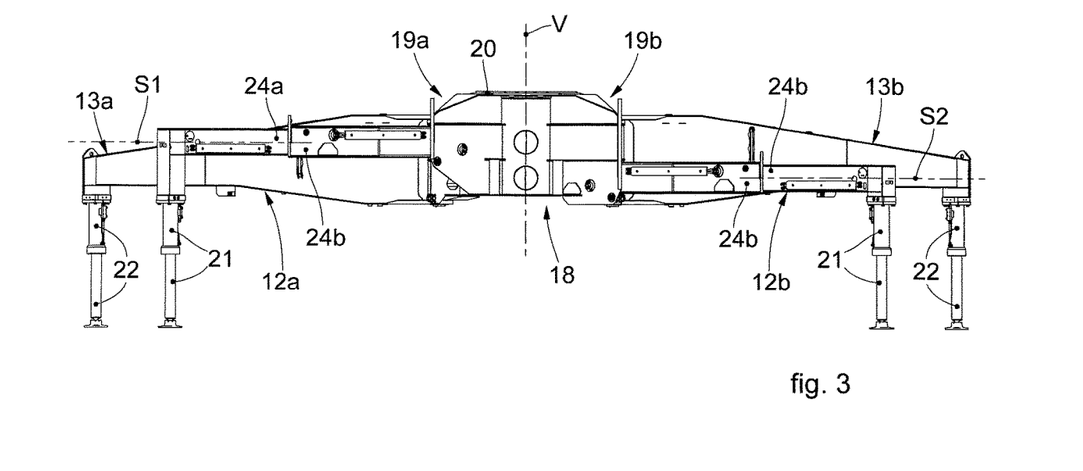
FIG. 3 is a lateral view of a support structure of the stabilizing legs.

The sliding axes S1 and S2, even if offset in height, see for example FIG. 4, intersect at different heights the axis of rotation V of the movement turret 14, see FIG. 3 for example.

The sliding axes S1 and S2, therefore ultimately also the box-like elements 19a and 19b, are offset in height so that the front stabilizing legs 12a and 12b, that is, their telescopic elements 24a, 24b, do not interfere with each other and therefore have the necessary space for sliding inside the corresponding box-shaped elements 19a and 19b of the support structure 18.

Each box-like element 19a and 19b of the support structure 18 comprises a second end 25a and 25b, opposite the first end 23a and 23b, on which the back stabilizing legs 13a and 13b are pivoted, which therefore can rotate with respect to corresponding axes of rotation R1 and R2 from an inactive closed position to an open operating position, or vice versa.

Figure 5:
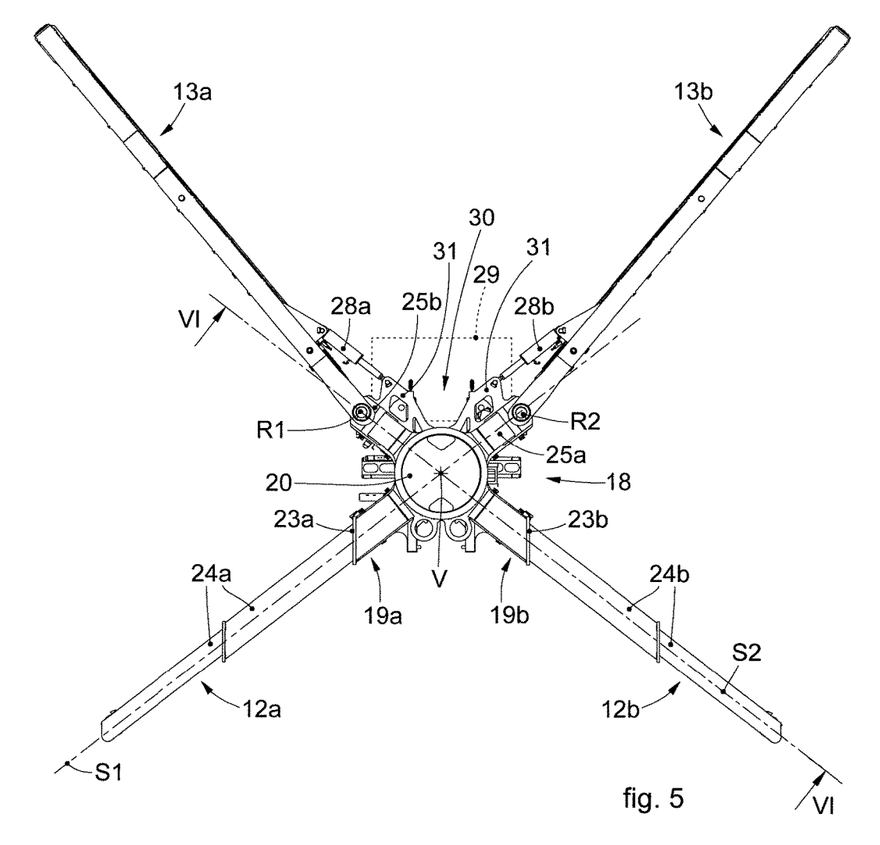
FIG. 5 is a plan view of the support structure of the stabilizing legs in the previous drawings.

The back stabilizing legs 13a and 13b can be connected to the support structure 18 and in particular to the second end 25a and 25b of the box-like elements 19a and 19b by means of a rotation pin 27a and 27b defining an axis of rotation R1 and R2, for rotation of the back stabilizing legs 13a, 13b, see FIG. 4 or 5 for example.

The back stabilizing legs 13a and 13b can pass from the closed inactive position to the open operating position by rotation around the axes of rotation R1 and R2.

Corresponding actuators 28a and 28b can be connected to the back stabilizing legs 13a, 13b and to the support structure 18, to take the back stabilizing legs 13a, 13b from the inactive position to the active position, or vice versa.

As can be observed in particular in FIG. 5, any one of the two sliding axes S1 and S2 of the telescopic elements 24a or 24b of the front stabilizing legs 12a or 12b is aligned with the axis of rotation R1 or R2 of the corresponding back stabilizing leg 13a or 13b.

Therefore, the housing seating 20 for the movement turret 14 is made in the crossing zone Z in which the sliding axes S1 and S2 and thus the box-like elements 19a and 19b converge.

According to a possible embodiment, the first end 23a, 23b and the second end 25a, 25b of each box-like element 19a, 19b are aligned with each other along the respective sliding axis S1, S2.

According to another embodiment, each sliding axis S1, S2 intersects the axis of rotation V of the movement turret 14.

According to another embodiment, each sliding axis S1, S2 of one of the front stabilizing legs 12a, 12b intersects one of the axes of rotation R1, R2 of one of the back stabilizing legs 13a, 13b, see the plan view in FIG. 5.

In particular, this reciprocal disposition of the sliding axes S1 and S2 and of the axis of rotation V allows to distribute the mechanical loads induced by the movement turret 14 toward the front and back stabilizing legs in a uniform manner.

In particular, the mechanical loads can be discharged from the center of the housing seating 20 toward the first ends 23a, 23b and toward the second ends 25a, 25b along a substantially radial path, with respect to the center of the housing seating 20. This prevents excessive deviations of the loads that can cause extremely high intensification of the stresses in correspondence with specific components, with consequent damage thereto.

The positioning of the housing seating 20 of the movement turret 14 in the crossing zone Z of the box-shaped elements 19a and 19b of the support structure 18, so that any whatsoever of the axes of rotation R1 and R2 of the back stabilizing legs 13a and 13b is opposite, with respect to the seating 20, to any whatsoever of the two open ends 23a and 23b of the box-shaped elements 19a and 19b, confers great compactness on the support structure 18 and optimal distribution of the loads, consequent to the use of the front and back stabilizing legs 12a and 12b and 13a and 13b.

As can be seen, advantageously, the opposite ends 23a and 23b and 25a and 25b of the box-like elements 19a and 19b can be disposed close together or in proximity to the housing seating 20 of the movement turret 14.

By way of example only, it can be provided that the housing seating 20 has a substantially cylindrical conformation and that the opposite ends 23a, 23b, 25a, and 25b are located on the periphery and tangent to the housing seating 20.

This disposition allows to further increase the compactness of the support structure 18 and further improve the distribution of loads, consequent to the use of the front and back stabilizing legs 12a and 12b and 13a and 13b.

The distance between any one of the axes of rotation R1 or R2 of the back stabilizing legs 13a or 13b and the axis of rotation V of the movement turret 14 can also be substantially equal to the distance between the axis of rotation V and any one of the open ends 23a or 23b of the box-like elements 19a or 19b.

Moreover, the axis of rotation V of the movement turret 14 can be substantially perpendicular to the sliding axes S1 and S2 of the telescopic elements 24a and 24b.

The axis of rotation V of the movement turret 14 can also be parallel to the axes of rotation R1 and R2 of the back stabilizing legs 13a and 13b.

The mobile operating machine 10 will naturally be equipped with service systems 29, for example an oil tank or other.

Thanks to the compactness and the limited size of the support structure 18, the service systems 29 can be positioned outside the support structure 18, as shown schematically in FIG. 5.

By way of example only, it can be provided that the box-like elements 19a, 19b define between them a concavity 30 comprised between the second ends 25a, 25b of the box-like elements 19a, 19b, and in which the service systems 29 can be installed in a selectively removable manner.

In possible solutions, the support structure 18 can be provided with connection and support brackets 31, installed in the concavity 30 and configured to allow to connect and support the service systems 29.

This solution allows to greatly simplify the step of allocating spaces with regard to service systems 29, and in particular an oil tank.

The oil tank, unlike in known solutions, can be separate and independent from the support structure 18, which therefore has only a structural function.

This solution for attaching the oil tank makes the construction of the support structure extremely simple compared with known solutions.

It is clear that modifications and/or additions of parts can be made to the mobile operating machine as described heretofore, without departing from the field and scope of the present invention. It is also clear that, although the present invention has been described with reference to some specific examples, a person of skill in the art shall certainly be able to achieve many other equivalent forms of mobile operating machine, having the characteristics as set forth in the claims and hence all coming within the field of protection defined thereby.

The invention claimed is:

1. Mobile operating machine, provided with a work device supported by a movement turret, a pair of stabilizing front legs and a pair of stabilizing back legs, wherein said mobile operating machine comprises:
   a support structure provided with a pair of box-like elements configured to house said stabilizing front legs or back legs, and a positioning seating of said movement turret made in a crossing zone of said box-like elements,
   wherein each box-like element being provided with a first end that is open and through which a respective stabilizing front leg, or back leg, is slidingly mobile and a second end, opposite the first end and in correspondence with which a respective stabilizing back leg, or front leg, is pivoted, so as to rotate around a corresponding axis of rotation,
   wherein each box-like element is provided with a respective tubular cavity defining a respective sliding axis along which one of said stabilizing front legs is slidingly moved,
   wherein each sliding axis of said stabilizing front legs intersects an axis of rotation of said movement turret, and each sliding axis of one of said stabilizing front legs intersects one of said axes of rotation of one of the stabilizing back legs
   wherein said support structure is formed by a single block suitable to define said box-like elements and said positioning seating of the movement turret; and
   wherein said support structure is cross shaped, in the center of which said positioning seating of the movement turret is positioned.

2. Mobile operating machine as in claim 1, wherein said positioning seating of the movement turret is made above said box-like elements and an axis of rotation of the movement turret passes through it.

3. Mobile operating machine as in claim 2, wherein said axis of rotation of the movement turret is substantially parallel to the axes of rotation around which said stabilizing back legs rotate.

4. Mobile operating machine as in any claim hereinbefore, wherein said first end and said second end of each box-like element are aligned with each other along the respective sliding axis of one of said stabilizing front legs.

5. Mobile operating machine as in any claim from 2 to 4, wherein said axis of rotation of said movement turret is substantially perpendicular to said sliding axes.

6. Mobile operating machine as in any claim hereinbefore, wherein said sliding axes are offset in height.

7. Mobile operating machine as in any claim hereinbefore, wherein said stabilizing front legs, or back legs, sliding in said box-like elements, comprise telescopic extension elements along said sliding axes.

* * * * *